ABSTRACT

United States Patent [19]
Grotefend et al.

Figure 1:
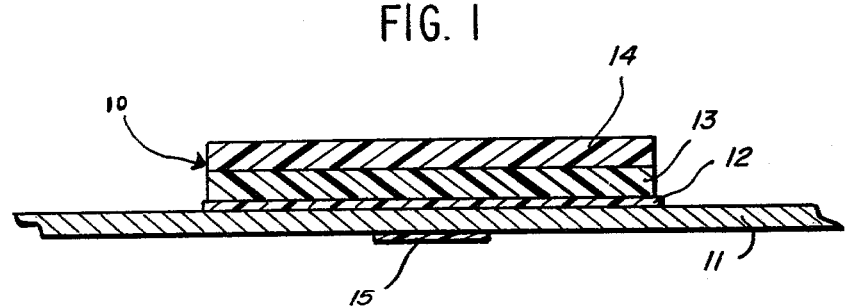

[11] 4,234,643
[45] Nov. 18, 1980

[54] TENNIS BALL MARKING DECALCOMANIA

[75] Inventors: Alan C. Grotefend, Glen Ellyn, Ill.; Stephen F. Thon, Jim Falls, Wis.

[73] Assignee: The Meyercord Co., Carol Stream, Ill.

[21] Appl. No.: 910,475

[22] Filed: May 30, 1978

[51] Int. Cl.² .................. B44C 1/16; B32B 27/36; B32B 23/04
[52] U.S. Cl. ................... 428/200; 428/202; 428/204; 428/207; 428/211; 428/212; 428/474.7; 428/475.2; 428/479.6; 428/913; 428/914; 156/240; 428/447; 428/480; 428/481; 428/482; 428/535; 428/423.5; 428/425.1
[58] Field of Search .............. 428/914, 423, 474.7, 428/475.2, 200, 212, 424, 202, 204, 207, 211, 913, 479.6, 447, 480–482; 427/148, 150; 156/230, 239, 240

[56] References Cited

U.S. PATENT DOCUMENTS

| | | | |
|---|---|---|---|
| 3,539,424 | 11/1970 | Tashlick | 428/914 |
| 3,616,176 | 10/1967 | Jachimowicz | 428/914 |
| 3,914,484 | 10/1975 | Creegan | 428/355 |
| 3,922,435 | 11/1975 | Asnes | 156/240 X |

FOREIGN PATENT DOCUMENTS

| | | | |
|---|---|---|---|
| 979747 | 12/1975 | Canada | 428/423 |
| 48-56014 | 3/1973 | Japan | 428/424 |
| 928347 | 6/1963 | United Kingdom | 428/914 |

OTHER PUBLICATIONS

General Mills, "Versamid", 1964, pp. 1–16.

Primary Examiner—George F. Lesmes
Assistant Examiner—Alexander S. Thomas
Attorney, Agent, or Firm—Merriam, Marshall & Bicknell

[57] ABSTRACT

A heat release type decalcomania for marking a tennis ball cover comprising a carrier sheet having on one surface thereof a clear film of thermosetting elastomer formed of a siliconized polyester composition and a blocked isocyanate composition which crosslink when heated at a temperature effecting release of the clear film from the carrier sheet and having on the clear film a composite design formed of a first color layer of a polyamide resin having a softening point of about 100° F. (38° C.) and a second color layer of a polyamide resin having a softening point of about 230° F. (110° C.) with both said layers having a low viscosity adapted to penetrate the tennis ball cover when the design is heated to a temperature at which said clear film is released from said carrier strip.

5 Claims, 2 Drawing Figures

TENNIS BALL MARKING DECALCOMANIA

The present invention relates generally to the application of a textual or decorative marking on an article having a tufted or felted surface with a deep nap, such as a cover of a tennis ball, and more particularly, to a decalcomania for application to the deep nap felted textile material forming the cover of a tennis ball or like play ball.

The cover of a tennis ball must have a deep fiber nap and generally rough surface in order to provide the desired friction between the ball and the racket and to give the ball a suitable trajectory through the air. A tennis ball cover having the required deep nap and rough surface is preferably formed mainly from wool or nylon fibers or mixtures thereof. The fibers are combined so as to form a pile fabric or by weaving or knitting the fiber into a fabric, such as melton, which is treated by a process known as fulling during which the fibers of the main and supplementary yarn are caused to intermesh or become entangled throughout. The resulting fulled fabric having a rough felted surface with a deep fiber nap is not readily provided with a long-lasting textual or decorative design by ordinary marking means, and considerable difficulty has been encountered in rapidly and economically applying a satisfactory textual or decorative marking on the cover of a tennis ball.

Heretofore, tennis ball covers have generally been marked with a textual or decorative design, such as the manufacturer's trademark, by applying a decalcomania after the cover material has been secured to the rubber ball forming the core of a tennis ball. Marking a tennis ball in this manner requires carefully orienting the tennis ball so that the mark can be properly positioned on the surface of the ball. It has also been proposed that the desired marking on a tennis ball cover be provided by silk screen printing directly on the flat dumbbell-shaped sections of tennis ball cover material and thereafter vulcanizing the sections onto the rubber ball forming the core of the tennis ball (see Australian Pat. No. 291,504). There is, however, a considerable volume of solution and volatile solvents which must be handled in any silk screening printing operation which many considered objectionable. Furthermore, a mark applied by silk screen printing directly on a textile material having a rough deep nap or felted surface of the type suitable for use as the cover of a tennis ball does not have the sharp delineation desired and, at best, provides a mark of limited wear resistance.

Accordingly, it is an object of the present invention to provide an improved marking element for a tennis ball cover which overcomes the disadvantages of previous tennis ball marking elements and procedures.

It is also an object of the present invention to provide a marking element in the form of an elastomeric decalcomania which is adapted to effectively mark the cover of a tennis ball in a more rapid and economical manner.

It is still another object of the present invention to provide a marking element in the form of an elastomeric decalcomania which is adapted to be readily applied to precut sections of textile material having a rough deep nap surface suitable for forming a tennis ball cover before the textile material is applied to the tennis ball core and which can be subjected to the heat and pressure in a mold used to vulcanize or otherwise secure the textile cover material to the tennis ball core without impairing the sharp delineation of the mark or contaminating the mold during vulcanization.

Figure 2:
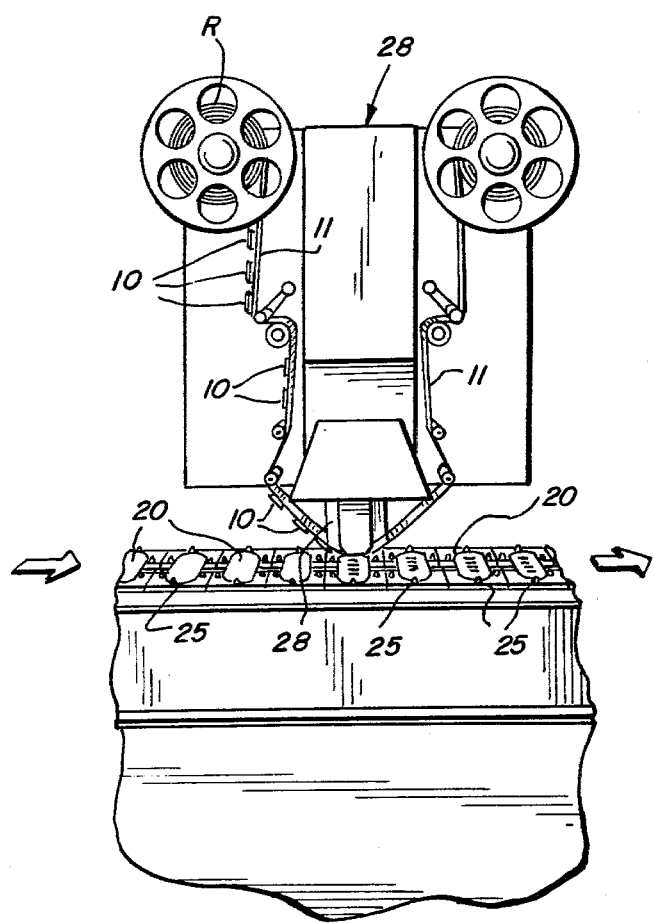

Other objects of the present invention will be apparent from the detailed description and claims to follow when read in conjunction with the accompanying drawing, wherein:

FIG. 1 of the drawing shows an enlarged vertical sectional view of the decalcomania of the present invention; and FIG. 2 is a perspective schematic diagram of apparatus suitable for carrying out applicant's process of applying a decalcomania to cover material of a tennis ball.

The foregoing objects of the present invention are achieved by providing a decalcomania 10 at spaced points on a continuous carrier strip 11 which is made into a roll (R). The strip 11 has a positioning mark or "key" 15 on one side of the strip at the center of each decalcomania 10 which is formed on the opposite surface thereof. The decalcomania 10 comprises a clear thermosetting elastomer layer 12 formed on the surface of the strip 11 and a composite design formed of two superimposed layers 13, 14 of at least distinct thermoplastic elastomeric compositions which contain a suitable dye to impart color to the design. The thermosetting elastomeric material used to form the clear layer 12 must have good heat release properties and be resistant to offsetting in a mold when the felted cover material bearing the decalcomania is subjected to heat and pressure when the cover sections are vulcanized or otherwise secured to the rubber core of the tennis ball. The design portion of the decalcomania which, for example, can be the manufacturer's trademark, is formed by first applying over the clear layer 12 of thermosetting elastomer a first layer 13 of a thermoplastic polyamide elastomeric material adapted to penetrate rapidly and deeply into the nap of a felted textile material, and then applying over the layer 13 a second or outer layer 14 formed of a thermoplastic polyamide elastomeric material which is also adapted during application of the decal to penetrate the nap of the said felted textile material and, which must be resistant to offsetting while in contact with the carrier strip 11 and key 15 while the decalcomania 10 remains in roll form. The natural wool fibers as well as the nylon fibers which form the cover material contain polyamide groups as their basic constituent.

The temporary backing member or carrier strip 11 on which the decalcomania 10 is preferably formed consists of a narrow strip of unlimited length made of thoroughly seasoned densified Kraft paper polished on both surfaces and is characterized by having good printing surfaces, the absence of a waxy residue after application, and good performance in the press. Other paper having similar properties can also be used.

The elastomeric marking element of the decalcomania 10 is comprised of a first layer 12 of clear thermosetting elastomeric material applied directly on the surface of the carrier strip 11. The clear layer 12 serves the dual function of providing good release properties from the carrier strip 11 and prevents the thermoplastic design from offsetting onto a vulcanizing mold wherein the dumbbell shaped cover sections of the tennis ball cover material bearing the decalcomania 10 are vulcanized to a rubber ball forming the core of the tennis ball.

A thermosetting elastomeric composition suitable for forming the clear thermosetting layer 12 has the following composition:

| Material | Supplier | Parts by Weight |
| --- | --- | --- |
| Polyester 6923-60 | Cargill | 51.0 |
| Polyurethane X-4510-40 | Cargill | 34.6 |
| Dibutyl Tin Dilaurate | Mooney | .3 |
| 45% CAB 551-0.2 Resin in Cellosolve Acetate | Eastman | 40.0 |
| Acrawax Paste | Glycol Chemical | 6.0 |
| Cellosolve Acetate | Ashland | 8.0 |

Polyester 6923-60 from Cargill, Inc. consists of a polyester resin dissolved in Cellosolve acetate at 60% resin concentration by weight. The polyester contains 30% silicone, and has an equivalent weight of 356 based on resin solids. The silicone modified polyester composition imparts slip and mar resistance to the elastomeric mark while in use on the tennis ball cover in addition to preventing offsetting of the marking element onto the tennis ball vulcanizing mold.

Other siliconized polyester compositions which can be used in place of the "Polyester 6923-60" (Cargill) produce is "AROPLAZ 1710R60" and "AROPLAZ 1711-A9-60", products of Ashland Chemical Co. AROPLAZ 1710 contains 50% silicone modification of the resin, and AROPLAZ 1711 contains 30% silicone. Both resins are supplied as 60% non-volatile solutions.

Polyurethane X-4510-40 from Cargill, Inc. is a ketoxime blocked aliphatic isocyanate prepolymer dissolved in equal portions by weight of xylol and Cellosolve acetate at 40% resin concentration by weight. The polyurethane has an equivalent weight of 255 based on resin solids.

Blocked isocyanate compounds which can be used in place of polyurethane X-4510-40 (Cargill) composition include compounds such as "MONDUR S" and "MONDUR SH", manufactured by Mobay Chemical Co., and when used in conjunction with the applicants' siliconized polyesters provide a decalcomania having an improved wear resistant surface on the tennis ball cover.

"MONDUR S" is a light-colored stabilized polyisocyanate adduct having a specific gravity of 1.26–1.28, a total solids of approximately 95%, available NCO of 11.5%–13.5%, and a softening point of 80°–120° C.

"MONDUR SH" is a light-colored, stabilized polyisocyanate adduct having a specific gravity of 1.25–1.28, a total solids of about 89%, available NCO of 10.5–13.5% and a softening point of 80°–120° C.

Each of the blocked isocyanate elastomers used in the present invention is stable at room temperature in a solvent mixture containing the polyester composition but reacts with the polyester composition on being heated to a temperature of about 425° F. (218° C.) which is used to effect release of the elastomeric mark from the carrier strip 11 and to effect deep penetration of the design into the fiber surface, as a result of the blocking groups, such as a ketoxime group or phenol group, being released and volatilized so that the isocyanate radical is free to react with the polyester molecules.

The dibutyl tin dilaurate compound serves as a catalyst for the reaction between the isocyanate and polyester groups.

The "CAB 551-0.2 Resins" is a high butyrate content cellulose acetate butyrate resin with good compatibility in many thermoset resin solutions and is incorporated in the clear resin composition to provide improved drying characteristics during printing. The cellulose acetate butyrate also provides good non-tacky film forming properties so that an air-dry film can be made prior to crosslinking. There is some reaction between the free hydroxyl groups of this cellulose resin and the isocyanate.

Acrawax paste is a dispersion of one part micronized ethylene-bis-stearamide (Glycol Chemicals, Inc.) and six parts cyclohexanol. The Acrawax paste improves flow and film leveling as well as serving as an anti blocking agent.

The decorative design portion of the marking element is made by screening two distinct layers of thermoplastic elastomeric compositions onto the clear layer 12 so as to provide a thick composite thermoplastic design having the ability to deeply penetrate into the nap of the tennis ball cover material while at the same time being resistant to offsetting when the decalcomania strip is in roll form. The decorative design layers are preferably screened onto the clear layer 12 by means of a 4 or 5 color web press of the type disclosed in U.S. Pat. No. 3,737,008 and wherein the last printing unit is kept open to facilitate completely drying the applied layer.

A suitable polyamide elastomeric composition for use in forming the inner design layer 13 has the following composition:

| Material | Supplier | Parts by Weight |
| --- | --- | --- |
| Versamid 940 Polyamid | General Mills | 22.0 |
| Versamid 100 Polyamid | General Mills | 22.0 |
| VM & P Naptha | Ashland | 24.6 |
| Butyl Alcohol | Ashland | 20.0 |
| Amyl Alcohol | Ashland | 9.4 |
| Spirit Nigrosine SSB Black Dye | G.A.F. | 1.0 |
| 8721 Flow Agent | Glidden | ¼oz./gal. |

Versamid 940 is a hard polyamide resin with a specific gravity of 0.97 and a Ball and Ring softening point of 230° F. (110° C.). The crystalline nature of the Versamid 940 resin is responsible for its characteristic sharp decrease in melt viscosity with increased temperature above its softening point. And, the sharp decrease in melt viscosity of Versamid 940 is to a large degree responsible for the excellent penetration into the fabric upon application of heat above the softening point of the resin. The excellent penetration of thermoplastic layer 13 and layer 14 forming the decorative composite design portion of the decalcomania is also due in part to the polyamide resin having an affinity to the wool and nylon fibers of the tennis ball cover material both of which are comprised of polyamide groups.

The inherent brittleness of the Versamid 940 resin is counteracted by using therewith a polyamide plasticizing resin, such as Versamid 100. Versamid 100 is a viscous liquid polyamide resin at room temperature, and in combination with Versamid 940 gives a flexible film having a softening point of about 100° F. (38° C.) with excellent heat sealability, low viscosity and fiber penetration when heated above the softening point.

Glidden 8721 flow agent is a bubble breaker used to obtain a smooth printed film. It consists of one percent Dow Corning 200 fluid in toluene and must be used very sparingly to avoid cratering and the side effects of silicone contamination.

In preparing the inner design layer 13 the solvent blend and the Versamid 940 polyamide resin are heated to approximately 130° to 140° F. (54° C. to 60° C.) with mixing and after about 45 minutes the Versamid 940 resin is completely dissolved. The Versamid 100 polyamide resin is then added to the resin solution while maintaining the temperature at approximately 130° to 140° F. (54° C. to 60° C.). The resin solution is allowed to cool at room temperature at least 24 hours and preferably 48 hours after which the resulting material is reduced to screening viscosity by adding amyl alcohol.

The thermoplastic elastomeric composition suitable for forming the outer design layer 14 and which is adapted to prevent sticking when the decalcomania is stored in roll form has the following composition:

| Material | Supplier | Parts by Weight |
|---|---|---|
| Butyl Alcohol | Ashland | 9.6 |
| Amyl Alcohol | Ashland | 24.6 |
| Kwik Dri | Ashland | 19.6 |
| Versamid 940 | General Mills | 35.3 |
| Versalon 1300 | General Mills | 8.8 |
| Spirit Nigrosine SSB Black Dye | G.A.P. | 1.9 |
| 8721 Flow Agent | Glidden | ½oz./gal. |

Versalon 1300 is a flexible thermoplastic polyamide resin with a Ball and Ring softening point of 203° F. (95° C.). The elastomeric nature of this resin gives rise to a significant decrease in melt viscosity as the temperature above its softening point is increased (i.e. Brookfield Viscosity of 46 at 410° C. or 210° C.), but exhibiting a much less abrupt drop in viscosity when heated above the softening point that does Versamid 940. The combination of Versamid 940 and Versalon 1300 gives films having very good penetration of the tennis ball cover at temperatures above the 230° F. (110° C.) softening point of Versamid 940 and at a temperature of about 425° F. (218° C.) to which the decalcomania 10 is heated in order to effect release of the clear layer 12 from the carrier sheet 11. The function of the Versalon 1300 is to plasticize the Versamid 940 to provide a transfer design having a tack free outer surface so that the transfer design bearing carrier sheet 11 can be formed in roll without the need for using a silicone container interliner or slip sheet.

Kwik Dri is a trade mark of Ashland Chemical Co. for an aliphatic hydrocarbon solvent with a distillation range of 315° F. (157° C.) to 337° F. (169° C.) and Kauri-Butanol number of 35. It is essentially a grade of mineral spirits with an evaporation rate about twice as fast as industrial grade mineral spirits.

The composition used for the outer design layer 14 is prepared in the same manner as the inner design layer 13 except that the Versamid 940 resin or the Versalon 1300 resin can be added to the solvent mixture first, last or simultaneously.

The polyamide resin Versamid 940 which forms the base of layer 13 has a Brookfield viscosity of 245 at 240° F. (110° C.) and viscosity of 8 when heated to 340° F. (171° C.). At a temperature of 420° F. (216° C.) the viscosity is extremely low and well below 8. Other polyamide resins of the foregoing type (Versamid 871, Versamid 930, and Versamid 1635) having a softening point ranging between about 200° F. and 230° F. (93° C. to 110° C.) can also be used. Each of the polyamide resins exhibits good adhesive properties.

Versalon 1300 has a Brookfield viscosity of about 180 at 340° F. (171° C.) and a viscosity of about 38 at a temperature of 420° F. (216° C.). When combined with Versamid 940 the resulting viscosity of the mixed resin is very low and well below 8 at 425° F. (218° C.).

The minimum thickness required to provide a decorative design or marking element having suitable properties for use in marking tennis balls is approximately 0.0033 inches (dry thickness).

The "key" 15 or black marking on the reverse side of the carrier strip 11 is a standard black thermosetting ink in a Cellosolve solvent and is used to properly align each decalcomania with the tennis ball cover section when being applied by automatic machinery of the type to be described hereinafter.

The decalcomania 10 is preferably applied to the felt cover material forming the tennis ball cover after the felt material has been cut into dumbbell-like sections, although it is possible to apply the decalcomania to the flat sheet or felt cover material before the dumbbell-like sections are cut from the sheet material.

A procedure for applying a decalcomania 10 to the dumbbell-like cover sections 20 of felted tennis ball cover material is illustrated in FIG. 2 of the drawing. If desired, however, the decalcomania can be applied by any other suitable apparatus, or by hand ironing.

The temperature at which the decalcomania is heated during application to a felted cover section 20 is in the range of about 425° F. (218° C.) with a dwell time of from ½ to 1¼ seconds and with an applied pressure of about 50-150 lbs./in². During application the decalcomania design deeply penetrates into the felt surface which generally is comprised largely of wool or nylon or a mixture thereof. When the applied heat is removed, the decalcomania solidifies rapidly. Further penetration of the decalcomania into the felted surface of the cover material takes place when the dumbbell-like cover sections are secured to the rubber core of the tennis ball, as by vulcanizing in a spherical mold wherein the cover material is heated to a temperature of about 320° F. (160° C.) for a period of from 4 to 5 minutes in a conventional tennis ball vulcanizing mold.

A procedure for applying the decalcomania of the present invention to flat dumbbell shaped cover sections 20 of the felted tennis ball cover material is illustrated in FIG. 2 of the drawing. The apparatus illustrated schematically in FIG. 2 comprises placing a plurality of the flat dumbbell shaped cover sections 20 of the felted tennis ball cover material onto a conveyor means 25. The conveyor means 25 moves a series of the dumbbell-shaped cover sections 20 past a decalcomania applicator machine 28 of the type described in U.S. Pat. No. 3,813,260 which applies heat and pressure as herein specified to one of the decalcomania 10 formed on an endless carrier strip 11 in roll form after alignment thereof directly over the cover section 20. After the design element has been attached to the cover section 20, the cover section 20 is lifted from the conveyor 25. The conveyor 25 is moved intermittently and while stopped the dumbbell-shaped cover section 20 is deposited on the conveyor 25, a marking element or decalcomania 10 is applied to the cover section 20 by the roll mark applicator machine 28, and the marked cover section 20 is removed from the conveyor 25. In the apparatus of the foregoing type the apparatus can be operated at about 40 cycles per minute with a total cycle time of about 1.5 seconds, a dwell time of 1.125 seconds and an indexing time of about 0.375 seconds.

The apparatus applies heat of about 425° F. (218° C.) and pressure of about 50–150 lbs/in.² to the strip 11 during the transfer of the decalcomania to the tennis ball cover section 20.

The decalcomania 10 of the present invention can be applied to a tennis ball cover surface by any other apparatus or by hand ironing, if desired.

We claim:

1. A heat release type decalcomania for application to a section of textile material formed of felted polyamide-containing textile material which is thereafter adapted for vulcanizing to a rubber surface in a mold comprising;
    (a) a paper-like wax-free flexible temporary carrier strip;
    (b) a clear film on one surface of said carrier strip formed of a mixture containing a blocked isocyanate stable at room temperature in a mixture containing a polyester, and a silicone modified polyester which when heated to heat release temperature for application of said decalcomania are adapted to react to form a thermoset elastomeric film and effect the release of said clear film from said carrier strip, and said thermoset elastomeric film also having high temperature mold release properties when heated in said mold; and
    (c) a pigmented thermoplastic elastomeric design fixedly supported by said clear film formed of a first pigmented layer of thermoplastic elastomer which is comprised of a blend of polyamide resins having a softening point of about 100° F. (38° C.) and a second pigmented layer of thermoplastic elastomer superimposed on said first pigmented layer comprised of a blend of polyamide resins having a softening point of about 230° F. (110° C.), said first and second pigmented layers when heated above said softening points during the heating to effect release of said clear film from said carrier strip and during said vulcanizing having a viscosity which enables said layers penetrating deeply into said felted polyamide-containing textile material, and said second layer being non-tacky and resistant to offsetting when placed in contact with said carrier strip at room temperature.

2. A decalcomania as in claim 1, wherein said thermosetting elastomer contains a cellulose acetate butyrate resin having a high butyral content to facilitate forming a non-tacky air dry film prior to heating to effect release of said clear film from said carrier strip.

3. A decalcomania as in claim 1, wherein said blocked isocyanate when heated to a temperature of about 425° F. (218° C.) crosslinks with said siliconized polyester to form a thermosetting elastomeric film having said high temperature mold release properties.

4. A decalcomania as in claim 1, wherein each said polyamide resin mixture has a Brookfield viscosity less than 8 when heated to temperature of about 420° F. (216° C.).

5. A decalcomania as in claim 1, wherein said temporary carrier strip is a strip of unlimited length formed of thoroughly seasoned densified Kraft paper polished on both surfaces in roll form.

* * * * *